United States Patent
Reiser et al.

(10) Patent No.: US 6,312,842 B1
(45) Date of Patent: Nov. 6, 2001

(54) WATER RETENTION SYSTEM FOR A FUEL CELL POWER PLANT

(75) Inventors: Carl Anthony Reiser, Stonington; Leslie L. Van Dine, Manchester, both of CT (US)

(73) Assignee: International Fuel Cells LLC, South Windsor, CT (US)

(*) Notice: Subject to any disclaimer, the term of this patent is extended or adjusted under 35 U.S.C. 154(b) by 0 days.

(21) Appl. No.: 09/201,262

(22) Filed: Nov. 30, 1998

(51) Int. Cl.[7] .................................................. H01M 8/00
(52) U.S. Cl. .............................................. 429/13; 429/26
(58) Field of Search ................................ 429/26, 19, 13

(56) References Cited

U.S. PATENT DOCUMENTS

| | | | |
|---|---|---|---|
| 4,769,297 | 9/1988 | Reiser et al. | 429/17 |
| 5,482,790 | * 1/1996 | Yamada et al. | 429/9 |
| 5,503,944 | 4/1996 | Meyer et al. | 429/13 |
| 5,573,866 | 11/1996 | Van Dine et al. | 429/13 |
| 5,605,770 | * 2/1997 | Andreoli et al. | 429/20 |
| 5,700,595 | 12/1997 | Reiser | 429/13 |

* cited by examiner

*Primary Examiner*—Stephen Kalafut
*Assistant Examiner*—Julian A. Mercado
(74) *Attorney, Agent, or Firm*—Malcolm J. Chisholm, Jr.

(57) ABSTRACT

The invention is a water retention system for a fuel cell power plant having at least one fuel cell and a coolant loop with a coolant reservoir and coolant passages for directing a coolant fluid through the fuel cell. An air conditioning unit is provided for directing a refrigerant to a first heat exchanger that cools secondary process air and for directing water condensed from the secondary process air to the coolant reservoir. The air conditioning unit also directs the refrigerant to a second heat exchanger that cools the coolant fluid within the coolant loop, and to a third heat exchanger that cools a plant exhaust stream exiting the plant. Water condensed from the plant exhaust is also directed from the third heat exchanger into the coolant reservoir.

12 Claims, 2 Drawing Sheets

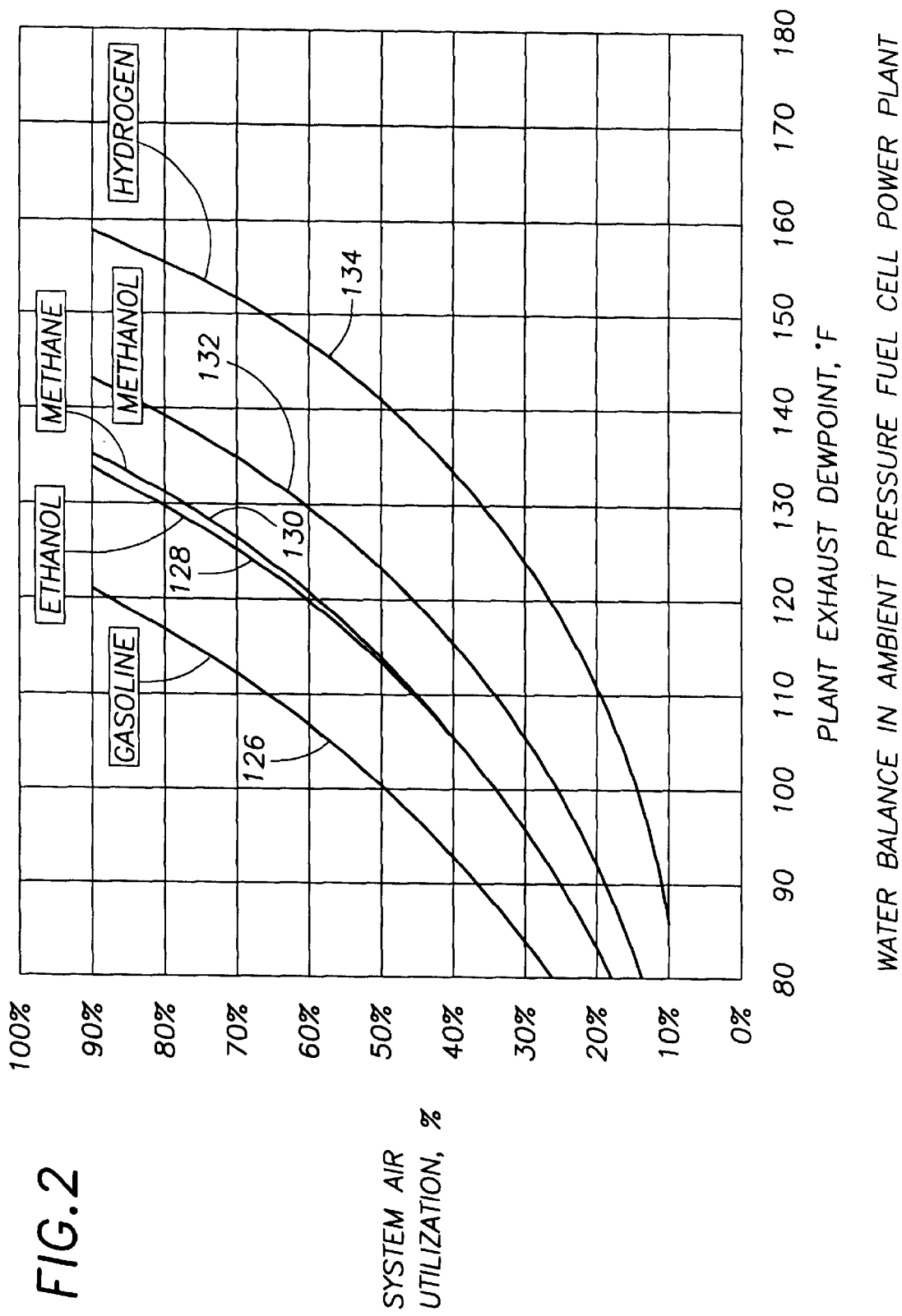

WATER RETENTION SYSTEM FOR A FUEL CELL POWER PLANT

TECHNICAL FIELD

The present invention relates to fuel cell power plants that operate at about ambient pressures and are suited for usage in transportation vehicles, as portable power plants, or as stationary power plants, and the invention especially relates to a fuel cell power plant that maximizes retention of water within the plant to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame that defines manifolds for directing flow of reducing, oxidizing, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane as the electrolyte, the hydrogen electrochemically reacts at a surface of an anode catalyst to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent the cathode. Porous water transport plates supply liquid water from a supply of coolant water to the anode electrode and remove water from the cathode electrode returning it back to the coolant water supply, and the plates thereby also serve to remove heat from the electrolyte and electrodes, as described in U.S. Pat. Nos. 4,769,297 and 5,503,944 assigned to the assignee of the present invention.

In operation of PEM fuel cells, it is critical that a proper water balance be maintained between a rate at which water is produced at the cathode electrode and rates at which water is removed from the cathode and at which liquid water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEN electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that enough water must be retained within the plant to offset losses from reactant fluids exiting the plant in order to efficiently operate the plant. For example, any water exiting the plant through a plant exhaust stream consisting of a cathode exhaust stream of gaseous oxidant and/or an anode exhaust stream of gaseous reducing fluid must be balanced by water produced electrochemically at the cathode electrode and water retained within the plant.

In particular, an ambient pressure, gasoline powered PEM fuel cell must be self-sufficient in water to be a viable power source for vehicles. Such a power source requires fuel processing components to process the gasoline into a hydrogen rich reactant fluid. The fuel processing components use water heated to steam in a burner to aid in processing the gasoline, and the water for the fuel processing components must be supplied from water produced at the cathode in the fuel cell as a result of the above described electrochemical reaction. As is well-known however, the water produced at the cathode electrode is swept from the cell within the cathode exhaust stream. It is known to recover some of the water in the cathode exhaust stream by passing the cathode exhaust stream through a condensing heat exchanger to cool the stream and thereby condense the water out of the stream. The condensed water is then accumulated and directed to the fuel processing components as required to maintain the plant in water balance.

An example of a PEM fuel cell power plant using a condensing heat exchanger is shown in U.S. Pat. No. 5,573, 866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode electrode. Prior to entering the cathode housing, the same stream provides air as the oxidant for the cathode electrode, and upon leaving the chamber the stream includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced water balance and energy efficiency of ambient fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air cooling fluid passes through a heat exchanger, performance of the exchanger will vary as a direct function of the temperature of the ambient air because decreasing amounts of liquid precipitate out of power plant exhaust streams as the ambient air temperature increases.

An additional complication of known fuel cell power plants designed for use in transportation vehicles is also related to fluctuations in ambient air conditions. Fuel cells of such plants typically utilize ambient air as the oxidant directed to the cathode electrode. Hot and dry ambient air increases a risk that the cathode electrode will dry out because such hot, dry air removes water more quickly by evaporation than does cool, moist oxidant supply air. Such hot, dry ambient air raises a dewpoint of the plant exhaust stream effectively moving the plant out of water balance.

Consequently, many efforts have been undertaken to prevent excess water loss resulting in drying out of the cathode electrode and adjacent electrolyte especially in PEM fuel cells, including: directing liquid condensate from condensing heat exchangers to humidify gaseous reactant and oxidant streams entering the cell; adding porous support layers and water transport plates in fluid communication with the electrodes for movement of coolant water through adjacent cells; generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell; and, increasing air utilization by the cathode through decreasing volumetric flow of the oxidant stream by the cathode. Such efforts at maintaining efficient water balance involve additional cost, weight, volume burdens, fuel cell performance penalties, and often require complicated control apparatus.

An alternative approach to enhancing water balance for fuel cell power plants in transportation vehicles is to pressurize the cell and related components to increase reactant concentrations in high pressure gaseous streams and thereby reduce water loss through plant exhaust streams. Such pressurized fuel cell power plants, however, require additional cost, weight and control apparatus in providing appropriate pressure housings and controls, and pressurized plants require additional energy derived from the plant to operate pressurizing pumps, valves, fans, etc., and are not known to be practical for portable power plants.

Accordingly, known pressurized plants and plants that employ ambient air as the cathode oxidant or that use ambient air for condensing heat exchangers are incapable of maximizing an efficient water balance and minimizing operating energy requirements because of their above described characteristics. It is therefore highly desirable to produce a fuel cell power plant that maximizes retention of water within the plant to achieve an efficient water balance.

DISCLOSURE OF THE INVENTION

The invention is a water retention system for a fuel cell power plant. The system includes: a fuel cell power plant having at least one fuel cell and a coolant loop with a coolant reservoir and coolant passages for directing a coolant fluid through a coolant transport plate adjacent cathode and anode support plates within the fuel cell; and, an air conditioning unit for providing a refrigerant to a first heat exchanger that cools secondary process air and for directing water condensed from the secondary process air to the coolant reservoir, for providing the refrigerant to a second heat exchanger that cools the coolant fluid within the coolant loop, and for providing the refrigerant to a third heat exchanger that cools a plant exhaust stream exiting the plant and for directing water condensed from the plant exhaust stream into the coolant reservoir. The secondary process air may be for example vehicle passenger compartment air. At least one of the anode or cathode support plates may be porous for movement of the coolant fluid within the cell.

In a further embodiment, the water retention system also includes a cathode exhaust recycle loop that selectively directs a portion of a cathode exhaust stream exiting the fuel cell to mix with a process oxidant stream entering the fuel cell within an oxidant inlet passage to recycle water within the cathode exhaust stream back into the fuel cell. In an additional embodiment, the water retention system includes a burner exhaust recycle loop that selectively directs a portion of an anode exhaust stream that has exited the fuel cell and has been burned in an auxiliary burner to mix with a reducing fluid in a reducing fluid inlet and/or to mix with the process oxidant stream within the oxidant inlet passage to thereby recycle water within the burned exhaust stream back into the fuel cell.

The water retention system for a fuel cell power plant may be used for example in a passenger vehicle such as an automobile wherein at least one fuel cell produces an electric current to power at least one electric motor to operate the vehicle. In an average ambient operating temperature range of for example 0 to 70 degrees fahrenheit ("° F."), the oxidant supplied to the fuel cell is ambient air, and the second and third heat exchangers use ambient air as a heat removal fluid to cool the coolant fluid in the coolant loop and the plant exhaust stream. In order to prevent the fuel cell power plant from moving out of water balance as ambient temperatures climb based on a change in an operating environment of the vehicle, the air conditioning unit, such as a conventional automobile air conditioner, is activated to provide a refrigerant to the first heat exchanger to cool the secondary process air circulating within a passenger compartment of the vehicle to thereby cool the passengers as in conventional automobiles. Water condensed from the secondary process air is then directed from the first heat exchanger to the coolant reservoir.

The air conditioning unit may also provide refrigerant to the second and third heat exchangers to reduce the temperature of the coolant fluid in the coolant loop and the plant exhaust stream leaving the plant, while water condensed from the plant exhaust stream passing through the third heat exchanger is also directed to the coolant reservoir. Additionally, the cathode exhaust recycle loop may be selectively utilized to recycle portions the cathode exhaust stream back into the process oxidant stream entering the fuel cell, and the burner exhaust recycle loop may be similarly utilized to recycle portions of the anode exhaust back into the fuel cell so that water vapor in the cathode exhaust and burner exhaust is recycled back into the fuel cell. The water vapor recycled back into the fuel cell serves to humidify the process oxidant stream directed to the cathode electrode of the cell and to humidify the reducing fluid stream directed to the anode electrode of the fuel cell thereby reducing loss of water generated at the cathode into the plant exhaust stream during operation of the fuel cell. Use of the refrigerant of the air conditioning unit serves to further decrease loss of water generated at the cathode by reducing the temperature of the coolant fluid that cools the process oxidant stream passing through the cell thereby decreasing capacity of the oxidant stream to hold evaporated water. Additionally, use of the refrigerant to cool the first and third heat exchangers thereby increasing their capacity to condense water, and directing the water condensed from the first and third heat exchangers into the coolant reservoir, further serves to retain water within the fuel cell.

Accordingly, it is a general object of the present invention to provide a water retention system for a fuel cell power plant that overcomes deficiencies of the prior art.

It is a more specific object to provide a water retention system that utilizes a conventional air conditioning unit of a passenger vehicle such as an automobile to enhance water retention of a fuel cell power plant.

It is yet another specific object to provide a water retention system that includes a plurality of components that may be sequentially utilized to retain water as water loss from an ambient pressure fuel cell power plant increases in response to increasing ambient temperatures.

It is a further specific object to provide a water retention system for a fuel cell power plant that includes components for retaining water within the plant that may be utilized while minimizing performance penalties of the cell.

These and other objects and advantages of this invention will become more readily apparent when the following description is read in conjunction with the accompanying drawings.

BRIEF DESCRIPTION OF THE DRAWINGS

FIG. 2 is a graph showing a correlation between air utilization of a fuel cell and a plant exhaust dewpoint for a variety of potential reducing fluid fuels for a fuel cell to explain maintenance of a water balance in the fuel cell.

DESCRIPTION OF THE PREFERRED EMBODIMENTS

Figure 1:
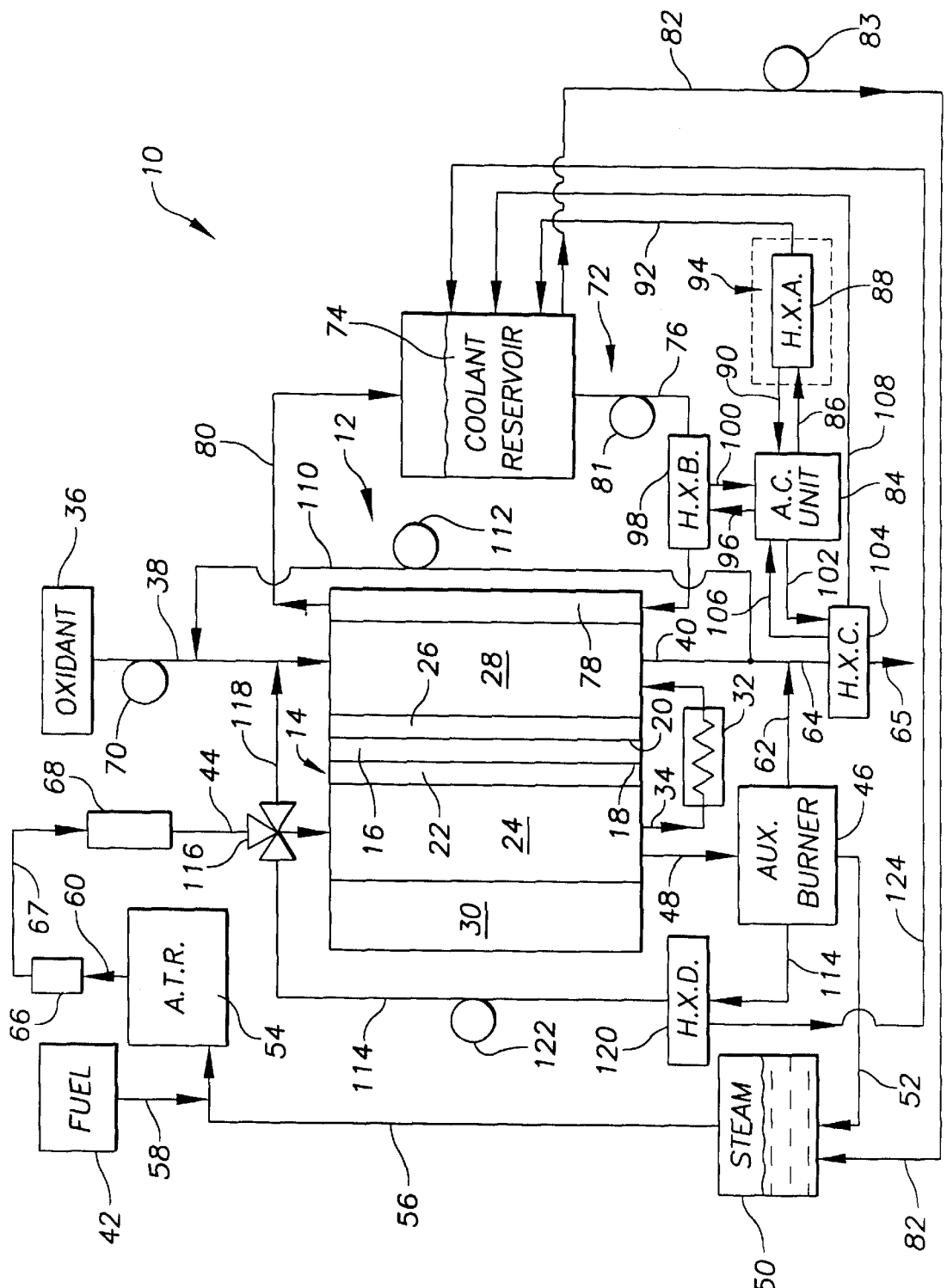
FIG. 1 is a schematic representation of a water retention system for a fuel cell power plant constructed in accordance with the present invention.

Referring to the drawings in detail, a water retention system for a fuel cell power plant constructed in accordance with the present invention is shown in FIG. 1, and generally designated by the reference numeral 10. The system includes a fuel cell power plant 12 having at least one fuel cell means for producing an electric current from a reducing fluid and an oxidant stream, such as fuel cell 14 having an electrolyte 16 such as a proton exchange membrane ("PEM") or an acid or base electrolyte having a first major surface 18 and an opposed second major surface 20; an anode electrode 22, supported by a porous anode support layer 24, in intimate contact with the first major surface 18 of the electrolyte 16; and, a cathode electrode 26, supported by a porous cathode support layer 28, in intimate contact with the second major surface 20 of the electrolyte 16. The anode and cathode porous support layers 24, 28 may be formed of porous or non-porous graphite, carbon or metal layers so that pores, channels or voids in the anode porous support layer 24 define an anode flow field adjacent the anode electrode 22, and pores, channels or voids in the cathode porous support layer 28 define a cathode flow field adjacent the cathode electrode 26. The fuel cell 14 may be combined with other virtually identical fuel cells (not shown) in a well-known manner to form a stack which is often referred to as a cell stack assembly.

As is common in the art, the fuel cell 14 may be enclosed within a frame or structure 30 of the power plant 12 that defines manifolds for directing streams of reducing fluids and oxidants into and out of the cell, and the structure 30 also includes electrical conduction means for directing an electric current generated by the fuel cell 14 out of the power plant 12 to an electricity using device 32 such as an electric motor, through a standard external load circuit 34.

An oxidant or inlet stream such as air is directed from an oxidant source 36 into the fuel cell 14 through a primary oxidant passage 38 that passes a stream of oxidant into the porous cathode support layer 28 or cathode flow field so that the oxidant passes in contact with the cathode electrode 26 to provide oxidant to the electrode 26 for facilitating an electrochemical reaction at the cathode electrode and for sweeping into the oxidant stream by evaporation and/or entrainment water formed at the cathode electrode 26 as well as water carried through the electrolyte 14 from the anode electrode 22 or any humidification water in the oxidant stream. The oxidant stream then passes out of the porous cathode support layer 28 as a cathode exhaust stream within a cathode exhaust passage 40.

A reducing fluid stream such as hydrogen is directed from a fuel supply source 42 directly through a reducing fluid inlet 44 into the porous anode support layer 24 or anode flow field so that the reducing fluid comes into contact with the anode electrode 22. In a well-known manner, the reducing fluid electrochemically reacts at the anode electrode 22 to produce protons and electrons, wherein the electrons flow through the external load circuit 34 to power the electrical device 32 such as electric motors powering a transport vehicle, while the protons travel through the electrolyte 16 to the cathode electrode 26. The electrons then continue through the circuit 34 to the cathode electrode where they react with the oxidant and protons to form water and heat.

The water retention system 10 for a fuel cell power plant 12 may also include fuel processing component means for processing hydrocarbon fuels into reducing fluids appropriate for providing fuel to an anode electrode of a fuel cell. Exemplary hydrocarbon fuels for powering such a fuel cell 14 include gasoline, diesel fuel, butane, propane, natural gas, methanol, ethanol, etc. The fuel processing component means may include: an auxiliary burner 46 (labeled "AUX. BURNER" in FIG. 1 for convenience) that burns a fuel including any excess reducing fluid such as hydrogen fed to the burner 46 as an anode exhaust stream through an anode exhaust passage 48 from the anode support layer 24; a steam generator 50 (labeled "STEAM" in FIG. 1) that receives heat directly from the burner 46 in a heat conduit 52 to generate steam from a supply of water; a reformer 54 that may be an autothermal reformer (labeled "A.T.R." in FIG. 1) that receives steam from the steam generator 50 mixed with the hydrocarbon fuel through steam line 56; the fuel supply source 42 (labeled "FUEL" in FIG. 1) that supplies the fuel to the steam line 56 through fuel line 58; a reformed fuel discharge line 60 that directs the reformed fuel from the reformer 54 into the reducing fluid inlet 44; and a burner exhaust passage 62 that directs the burned anode exhaust stream from the auxiliary burner 46 to a plant exhaust passage 64 where the burned anode exhaust stream mixes with the cathode exhaust stream within the plant exhaust passage 64 to become a plant exhaust stream and exit the plant 12 exhaust vent 65. Any unused hydrogen rich reducing fluid in the anode exhaust stream is ignited in the auxiliary burner 46, thereby rendering the anode exhaust stream leaving the burner 46 within the burner and plant exhaust passages 62, 64 non-flammable, maximizing steam generation by the steam generator 50, as well as maximizing water recovery from the anode exhaust stream. During start-up of the power plant or transients, a combustible fuel such as gasoline may be fed to the burner 46 to generate adequate heat, but during normal operation, the anode exhaust stream supplies all fuel necessary for steam generation.

The fuel processing component means may also include components that are well-known in conventional steam reforming, autothermal reforming of various chemical compounds, and partial oxidation reforming, all of which include a reformer component. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received in the fuel-steam mixture to reach temperatures approximating 1,700 degrees fahrenheit (hereafter "° F."). Additional fuel processing component means may include a shift reactor 66 connected by line 67 to a selective oxidizer 68, both of which are secured in fluid communication between the reformed fuel discharge line 60 and the reducing fluid inlet 44 in order to minimize carbon monoxide levels in the reducing fluid stream entering the anode support layer 24, as is well-known in the art.

The fuel cell power plant 12 may also include a first blower 70 positioned on the primary oxidant passage 38 to variably accelerate flow of gaseous oxidant into the plant 10. The blower 70 is of a capacity to only slightly increase operating pressures of the oxidant to a range of from atmospheric pressure to about 1.0 P.S.I. above atmospheric pressure, or from about 14.7 P.S.I.A. to about 15.7 P.S.I.A.

The water retention system 10 for the fuel cell power plant also includes a coolant loop 72 that directs a coolant fluid such as water from a coolant reservoir 74 through a first coolant passage 76 into a porous coolant transport plate 78 adjacent the porous cathode support plate 28, or alternatively through both the cathode support plate 28 and the anode support plate 24, and then through a second coolant passage 80 back to the coolant reservoir 74. The coolant loop 72 may also include a standard liquid coolant pump 81 to move the coolant liquid such as water through the loop 72. The coolant loop provides coolant liquid to the fuel cell 14 to lower a temperature of the cell. The liquid coolant may also move into or out of the coolant transport plate or coolant passage 76 into the porous anode or cathode support plates 24, 28 as required to maintain humidification of a PEM electrolyte 16; to remove product water formed at the cathode electrode 26; and, to recover water from the reactants and/or any recycle streams within any recycle loops (described below). In alternative embodiments, the first coolant passage 76 may pass the coolant fluid into and through the fuel cell 14 to the second coolant passage 80 to cool the fuel cell without passing the fluid through any specific coolant transport plate 76 or related component. A boiler feed line 82 and a boiler feed pump 83 secured between the coolant reservoir 74 and steam generator 50 selectively supply coolant fluid such as water from the reservoir to the steam generator 50.

The water retention system 10 for a fuel cell power plant 12 also includes an air conditioning means such as an air conditioning unit 84 for providing a refrigerant through a first refrigerant delivery line 86 to a first or secondary process air heat exchanger 88 (labelled "H.X.A." in FIG. 1 for convenience) that cools a secondary process air passing through the first heat exchanger 88, for directing the refrigerant back from the first heat exchanger 88 through a first refrigerant return line 90 to the air conditioning unit 84, and for directing water condensed from the secondary process air through a first or secondary process air condensed water line 92 to the coolant reservoir 74. The secondary process air passing through the first heat exchanger in heat exchange relationship with the refrigerant may be air circulating within a passenger compartment 94 that is shown schematically in hatched lines in FIG. 1, or may be any working fluid used for alternative demands of the fuel cell power plant 12 for a cooled working fluid.

The air conditioning unit 84 may also direct the refrigerant through a second refrigerant delivery line 96 to a second or coolant heat exchanger 98 (labelled "H.X.B." in FIG. 1) that is in fluid communication with the coolant in the coolant loop 72 so that the refrigerant passes in heat exchange relationship with the coolant in the second heat exchanger 98 to thereby cool the coolant. The refrigerant is then directed back to the air conditioning unit 84 from the second heat exchanger 98 in second refrigerant return line 100. The air conditioning unit 84 may also direct the refrigerant through a third refrigerant delivery line 102 to a third or plant exhaust stream heat exchanger 104 (labelled "H.X.C." in FIG. 1) in fluid communication with the plant exhaust stream in order to pass the exhaust stream in heat exchange relationship with the refrigerant in the third heat exchanger 104 to thereby cool the exhaust stream passing through the plant exhaust passage 64. The refrigerant is then directed back to the air conditioning unit 84 in third refrigerant return line 106, and water condensed from the plant exhaust stream is directed from the third heat exchanger 104 through a third or plant exhaust stream condensed water line 108 to the coolant reservoir 74. The air conditioning unit 84, refrigerant delivery and return lines 86, 90, 96, 100, 102, 106, heat exchangers 94, 98, 104, and condensed water lines 92, 108 may be manufactured from conventional air conditioning systems commonly known in the art for conditioning air of automobiles, trucks, busses, etc.

The water retention system 10 for a fuel cell power plant 12 may also include a cathode exhaust recycle loop 110 in fluid communication between the cathode exhaust passage 40 and the primary oxidant passage 38 dimensioned to direct a portion of the cathode exhaust stream from the cathode exhaust passage 40 into the oxidant stream in the primary oxidant passage 38 upstream of the porous cathode support plate 28 so that a portion of the cathode exhaust stream may be directed by the cathode recycle loop back into and through the cathode support plate. As shown in FIG. 1, the cathode recycle loop is secured to the cathode exhaust passage 40 upstream of a point on the passage 40 where the burner exhaust passage 62 joins the cathode exhaust passage 40. The cathode exhaust recycle loop 110 may also include a cathode exhaust blower 112 secured to the loop 110 to selectively control a rate of passage of the cathode exhaust through loop 110, such as blowers well known in the art that control rates of passage of fluids through pipes and similar passages.

The water retention system may also include a burner exhaust recycle loop 114 in fluid communication between the auxiliary burner 46 and an anode exhaust entry valve 116 secured to the reducing fluid inlet 44 that selectively controls passage of the burned anode exhaust stream within the burner exhaust recycle loop 114 into either the reducing fluid inlet 44, so that the burned anode exhaust goes into the anode support layer 24, or through a burned anode extension passage 118 between the valve 116 and the primary oxidant passage 38, so that the burned anode exhaust goes into the cathode support layer 28. It is stressed that the anode exhaust entry valve 116 is structured to restrict passage of the reducing fluid fuel in the reducing fluid inlet 44 from entering the primary oxidant passage 38, while selectively permitting flow of the burned anode exhaust into either the reducing inlet 44 or the primary oxidant passage 38, as can be readily accomplished by a valve or a combination of valves well-known in the art. The burner exhaust recycle loop may include a fourth or burned anode exhaust heat exchanger 120 (labelled "H.X.D." in FIG. 1) that passes the burned anode exhaust as a working fluid in heat exchange relationship with a coolant fluid such as ambient air or the refrigerant of the air conditioning unit 84 to cool the burned anode exhaust prior to entry into the fuel cell 14. Additionally, the burned anode exhaust loop may include an anode exhaust blower 122 that selectively controls a rate of passage of the burned anode exhaust stream through the burner exhaust recycle loop 114. A fourth or burned anode exhaust condensed water line 124 directs water condensed from burned anode exhaust passing through the fourth heat exchanger 120 to the coolant reservoir 74 to further retain water within the fuel cell power plant 12.

FIG. 2 is a graph entitled "Water Balance in Ambient Pressure Fuel Cell Power Plant" that shows a relationship between "Plant Exhaust Dewpoint" on an X axis and "System Air Utilization, %" on a Y axis in an effort to facilitate understanding of the need for and use of the water retention system 10 for a fuel cell power plant 12 of the present invention. The phrase "System Air Utilization, %" means the ratio of air taken from the oxidant stream and utilized by the fuel cell power plant 12 in generating an electric current to the quantity of oxidant supplied to the power plant 12. The graph shows that water balance is maintained at increasingly higher plant exhaust dewpoints as the air utilization increases. Raising the air utilization reduces the vapor pressure difference between the oxidant stream entering the cathode support plate or cathode flow field 28 and the cathode exhaust stream leaving the cell within the cathode exhaust passage 40, so that less water evaporates into the cathode exhaust stream to leave the cell. Therefore, by raising system air utilization, water balance is achieved at increasingly higher plant exhaust dewpoints which enables the fuel cell 14 to operate within water balance at higher ambient temperatures.

FIG. 2 plots a water-balance relationship between air utilization and dewpoint for five common fuels, wherein gasoline is represented by line 126, ethanol by line 128, methane by line 130, methanol by line 132, and hydrogen by line 134. If a plot of the system air utilization and plant exhaust dewpoint for one of the fuels at any given time remains above the line for that fuel 123, 128, 130, 132, or 134, then the fuel cell power plant is in water balance, so that the amount of water being lost through the plant exhaust stream is less than the amount of water being generated by the cathode electrode 26. For example, if the fuel is gasoline, the system air utilization is 40% and the plant exhaust dewpoint is 90° F., the power plant 12 is in water balance. However, if the system air utilization suddenly shifts to 30%, a plant operating point is then below the water-balance line 126, and the plant 12 is out of water balance and in jeopardy of having inadequate water to produce the hydrogen required by the fuel cell 14.

One method of returning the system back to water balance is to increase the per cent air utilization through use of the oxidant blower 70 on the primary oxidant passage 38 to decrease volumetric flow of the primary oxidant stream, and thereby increase per cent air utilization and decrease water loss. However use of the oxidant blower 70 can only effect air utilization within a limited range and is not an adequate solution for an ambient pressure fuel cell power plant 12. A better approach to returning the system to water balance is through use of the water retention system 10 of the present invention.

The water retention system 10 for a fuel cell power plant 12 includes a method of operation of the system to maintain the fuel cell power plant in water balance. If the fuel cell power plant 12 were to be used in an automobile to generate electric current to power electric motors moving the automobile, as the ambient temperatures increase, the fuel cell power plant will move out of water balance, and the amount of coolant such as water in the coolant reservoir will decrease, and must be replaced. The method of operation of the water retention system 10 then includes the step of first activating the air conditioning unit to direct the refrigerant to the first heat exchanger 88 to cool the secondary process air within passenger compartment and direct flow of water condensed from the secondary process air into the coolant reservoir to replace lost coolant. Next, the air conditioning unit is controlled to direct refrigerant to the second heat exchanger 98 to cool the coolant fluid in the coolant loop 72, which in turn cools the coolant fluid passing into the coolant transport plate 78 and cathode support plate 28, to thereby cool the oxidant stream adjacent the plate 28. That results in less of the water generated at the cathode electrode 26 being taken up in the cathode exhaust stream, which effectively lowers the plant exhaust dewpoint to move the power plant 12 back toward water balance. Next, the air conditioning unit is controlled to direct refrigerant to the third heat exchanger 104 to cool the plant exhaust stream passing through the exchanger 104 and thereby increase an amount of water condensed out of the plant exhaust stream, which condensed water is directed to the coolant reservoir 74.

Simultaneously with the above steps, and depending upon operational efficiencies and a need for an increased rate of return of the fuel cell power plant 12 back to water balance, the cathode recycle loop 110 may be controlled to direct a portion of the cathode exhaust stream to the primary oxidant passage 38, to thereby recycle some of the water generated at the cathode electrode that is lost to the cathode exhaust passage back directly into the porous cathode support plate 28. A rate of flow of the cathode exhaust stream through the cathode recycle loop may be controlled by the cathode exhaust blower 112. Additionally, the burned exhaust recycle loop may also be controlled at any time to direct a portion of the burned anode exhaust back into the either the porous anode or cathode support plates 24, 28, to further retain water within the fuel cell. The anode exhaust blower 122 may control a rate of recycling of the burned anode exhaust stream.

The water retention system 10 for a fuel cell power plant 12 may be controlled by conventional switches and valving mechanisms responding to sensors monitoring power plant activity, including for example, monitoring of amount of coolant in the coolant reservoir 74, temperature and/or relative humidity of the plant exhaust stream upstream of the third heat exchanger, and/or temperature of power plant 12 components, as is commonly done in controlling known condensing heat exchangers to minimize water loss.

While the water retention system 10 invention has been described and illustrated with respect to a particular construction, method of operation and working environment of a fuel cell power plant 12, it is to be understood by those skilled in the art that the system is not limited to the described and illustrated examples. For example, while the four heat exchangers 88, 98, 104 and 120 have been shown schematically as separated from each other, they may be arranged in a cooperatively stacked alignment to take advantage of common ducting of ambient air, as is known in the art, or in any relative positioning depending upon manufacture and operational efficiencies. Accordingly, reference should be made primarily to the attached claims rather than the foregoing description to determine the scope of the invention.

What is claimed is:

1. A water retention system for a fuel cell power plant comprising:
   a. at least one fuel cell having an electrolyte between an anode electrode and a cathode electrode for producing an electric current from a reducing fluid and an oxidant stream, and a coolant loop that directs a coolant fluid from a coolant reservoir through a coolant passage to the fuel cell means and back to the coolant reservoir through the coolant passage to cool the fuel cell and provide coolant fluid to the fuel cell;
   b. an air conditioning unit for providing a refrigerant to a secondary process air heat exchanger that passes the refrigerant in heat exchange relationship with a secondary process air for cooling the secondary process air, the air conditioning unit including a secondary process air condensed water line secured between the secondary process air heat exchanger and the coolant reservoir for directing water condensed from the secondary process air in the secondary process air heat exchanger to the coolant reservoir; and,
   c. wherein the air conditioning unit includes a plant exhaust stream heat exchanger that passes the refrigerant in heat exchange relationship with a plant exhaust stream exiting the fuel cell to cool the plant exhaust stream, and a plant exhaust stream condensed water line secured between the plant exhaust stream heat exchanger and the coolant reservoir for directing water condensed from the exhaust stream in the plant exhaust stream heat exchanger to the coolant reservoir.

2. The water retention system for a fuel cell power plant of claim 1, wherein the air conditioning means further comprises a coolant heat exchanger that passes the refrigerant in heat exchange relationship with the coolant fluid to cool the coolant fluid.

3. The water retention system for a fuel cell power plant of claim 1, wherein the system further comprises a cathode exhaust recycle loop secured in fluid communication between a cathode exhaust passage that receives a cathode exhaust stream leaving the fuel cell and a primary oxidant passage that directs the oxidant stream into the fuel cell adjacent the cathode electrode, the cathode exhaust recycle loop being dimensioned to direct a portion of the cathode exhaust stream leaving the fuel cell back into the primary oxidant stream entering the fuel cell to recycle water within the cathode exhaust stream back into the fuel cell.

4. The water retention system for a fuel cell power plant of claim 1, wherein the system further comprises a burner exhaust recycle loop secured in fluid communication between an auxiliary burner of a fuel processing component means for processing hydrocarbon fuels into the reducing fluid and between a reducing fluid inlet that directs the reducing fluid into the fuel cell, wherein the burner exhaust recycle loop directs an anode exhaust stream exiting the fuel cell that has been burned in the auxiliary burner back into the fuel cell as a burned anode exhaust stream to recycle water within the anode exhaust stream back into the fuel cell.

5. The water retention system for a fuel cell power plant of claim 4, wherein the burner exhaust recycle loop includes an anode exhaust recycle entry valve in fluid communication with the reducing fluid inlet and a primary oxidant passage that directs the oxidant stream into the fuel cell, wherein the anode exhaust recycle valve selectively directs the burned anode stream into the reducing fluid inlet and/or the primary oxidant passage.

6. The water retention system for a fuel cell power plant of claim 4, wherein the burner exhaust recycle loop includes a burned anode exhaust heat exchanger to cool the burned anode exhaust stream within the burner exhaust recycle loop, and a burned anode exhaust condensed water line secured between the burned anode exhaust heat exchanger and the coolant reservoir for directing water condensed from the burned anode exhaust stream in the burned anode exhaust heat exchanger to the coolant reservoir.

7. A water retention system for a fuel cell power plant comprising:
   a. at least one fuel cell having an electrolyte between an anode electrode and a cathode electrode for producing an electric current from a reducing fluid and an oxidant stream, and a coolant loop that directs a coolant fluid from a coolant reservoir through a coolant passage to the fuel cell means and back to the coolant reservoir through the coolant passage to cool the fuel cell and provide coolant fluid to the fuel cell;
   b. an air conditioning unit that provides a refrigerant to a plant exhaust stream heat exchanger that passes the refrigerant in heat exchange relationship with a plant exhaust stream exiting the fuel cell to cool the plant exhaust stream, and a plant exhaust stream condensed water line secured between the plant exhaust stream heat exchanger and the coolant reservoir for directing water condensed from the exhaust stream in the plant exhaust stream heat exchanger to the coolant reservoir;
   c. wherein the air conditioning unit includes a coolant heat exchanger that passes the refrigerant in heat exchange relationship with the coolant fluid to cool the coolant fluid;
   d. wherein the system further comprises a cathode exhaust recycle loop secured in fluid communication between a cathode exhaust passage that receives a cathode exhaust stream leaving the fuel cell and a primary oxidant passage that directs the oxidant stream into the fuel cell adjacent the cathode electrode, the cathode exhaust recycle loop being dimensioned to direct a portion of the cathode exhaust stream leaving the fuel cell back into the primary oxidant stream entering the fuel cell to recycle water within the cathode exhaust stream back into the fuel cell; and, e. wherein the system further comprises a burner exhaust recycle loop secured in fluid communication between an auxiliary burner of a fuel processing component means for processing hydrocarbon fuels into the reducing fluid and between a reducing fluid inlet that directs the reducing fluid into the fuel cell, wherein the burner exhaust recycle loop directs an anode exhaust stream exiting the fuel cell that has been burned in the auxiliary burner back into the fuel cell as a burned anode exhaust stream to recycle water within the anode exhaust stream back into the fuel cell.

8. The water retention system for a fuel cell power plant of claim 7, wherein the burner exhaust recycle loop includes an anode exhaust recycle entry valve in fluid communication with the reducing fluid inlet and a primary oxidant passage that directs the oxidant stream into the fuel cell, wherein the anode exhaust recycle valve selectively directs the burned anode stream into the reducing fluid inlet and/or the primary oxidant passage.

9. The water retention system for a fuel cell power plant of claim 7, wherein the burner exhaust recycle loop includes a burned anode exhaust heat exchanger to cool the burned anode exhaust stream within the burner exhaust recycle loop, and a burned anode exhaust condensed water line secured between the burned anode exhaust heat exchanger and the coolant reservoir for directing water condensed from the burned anode exhaust stream in the burned anode exhaust heat exchanger to the coolant reservoir.

10. A water retention system for a fuel cell power plant comprising:

a. at least one fuel cell having an electrolyte between an anode electrode and a cathode electrode for producing an electric current from a reducing fluid and an oxidant stream, and a coolant loop that directs a coolant fluid from a coolant reservoir through a coolant passage to the fuel cell means and back to the coolant reservoir through the coolant passage to cool the fuel cell and provide coolant fluid to the fuel cell;

b. an air conditioning unit for providing a refrigerant to a coolant heat exchanger that passes the refrigerant in heat exchange relationship with the coolant fluid to cool the coolant fluid;

c. wherein the system further comprises a cathode exhaust recycle loop secured in fluid communication between a cathode exhaust passage that receives a cathode exhaust stream leaving the fuel cell and a primary oxidant passage that directs the oxidant stream into the fuel cell adjacent the cathode electrode, the cathode exhaust recycle loop being dimensioned to direct a portion of the cathode exhaust stream leaving the fuel cell back into the primary oxidant stream entering the fuel cell to recycle water within the cathode exhaust stream back into the fuel cell; and, d. wherein the system further comprises a burner exhaust recycle loop secured in fluid communication between an auxiliary burner of a fuel processing component means for processing hydrocarbon fuels into the reducing fluid and between a reducing fluid inlet that directs the reducing fluid into the fuel cell adjacent the anode electrode, wherein the burner exhaust recycle loop directs an anode exhaust stream exiting the fuel cell that has been burned in the auxiliary burner back into the fuel cell as a burned anode exhaust stream to recycle water within the anode exhaust stream back into the fuel cell.

11. A method of operating a water retention system for a fuel cell power plant having at least one fuel cell for producing an electric current from a reducing fluid and an oxidant stream, and having a coolant loop that directs a coolant fluid from a coolant reservoir to the fuel cell and back to the coolant reservoir, the method of operating comprising the steps of:

a. activating an air conditioning unit;

b. passing refrigerant of the activated air conditioning unit through a secondary process air heat exchanger in heat exchange relationship with a secondary process air to cool the secondary process air;

c. directing flow of water condensed from the secondary process air from the secondary process air heat exchanger to the coolant reservoir;

d. passing refrigerant of the activated air conditioning unit through a coolant heat exchanger in heat exchange relationship with the coolant fluid in the coolant loop to cool the coolant fluid; and, e. passing refrigerant of the activated air conditioning unit through a plant exhaust stream heat exchanger in heat exchange relationship with a plant exhaust stream exiting the fuel cell and directing flow of water condensed from the plant exhaust stream from the plant exhaust stream heat exchanger to the coolant reservoir.

12. The method of operating the water retention system of claim 11, comprising the further steps of directing a portion of a cathode exhaust stream leaving the fuel cell through a cathode exhaust recycle loop back into the fuel cell to return water in the cathode exhaust stream back into the fuel cell, and directing a burned anode exhaust stream leaving the fuel cell through a burner exhaust recycle loop back into the fuel cell to return water in the burned anode exhaust stream back into the fuel cell.

* * * * *